United States Patent

[11] 3,543,659

| [72] | Inventor | Robert L. Moore<br>La Grange, Illinois |
| --- | --- | --- |
| [21] | Appl. No. | 630,707 |
| [22] | Filed | April 13, 1967 |
| [45] | Patented | Dec. 1, 1970 |
| [73] | Assignee | United States Camera Corporation<br>Chicago, Illinois<br>a corporation of Illinois |

[54] MOTORIZED STILL CAMERA
7 Claims, 13 Drawing Figs.

[52] U.S. Cl. .................................................... 95/11;
 95/31
[51] Int. Cl. ...................................................... G03b 19/04
[50] Field of Search........................................... 95/11,
 31(Misc), 31(Elec), 31(FSL)

[56] References Cited
UNITED STATES PATENTS

| 2,552,250 | 5/1951 | Bornemann et al. | 95/31X |
| --- | --- | --- | --- |
| 3,169,460 | 2/1965 | Winkler et al. | 95/31 |
| 3,232,196 | 2/1966 | Sapp et al. | 95/31 |
| 3,369,468 | 2/1968 | Sapp et al. | 95/31X |
| 3,406,621 | 10/1968 | Irwin | 95/31 |

FOREIGN PATENTS

| 37/2,230 | 5/1962 | Japan | 95/31 |
| --- | --- | --- | --- |

Primary Examiner—Norton Ansher
Assistant Examiner—Fred L. Braun
Attorney—Fidler, Bradley, Patnaude and Lazo ABSTRACT: A still camera having a subassembly housing on the top portion of the camera for supporting an electrical motor which advances the film and also causes an indexing mechanism to rotate a flash cube. A control mechanism for the motor includes a sensing finger movable by a retractor between a position above the surface of the film for closing a switch to start the motor and a second position engaging a perforation in the film corresponding to one of the film frame positions for closing another switch to cause dynamic braking of the motor to abruptly stop the film at the next film frame position. The indexing mechanism includes a gear assembly, a spring element, and a pawl member connected to the spring element for rotating the flash cube in response to advancement of the film by the motor. The gear assembly has a connecting member which connects the spring element to the gear assembly in response to actuation of the shutter so that the spring element is biased during operation of the motor. A release device subsequently disconnects the spring element from the gear assembly thus releasing the spring element from its biased position to rotate the flash cube.

Patented Dec. 1, 1970
3,543,659
Sheet 1 of 3
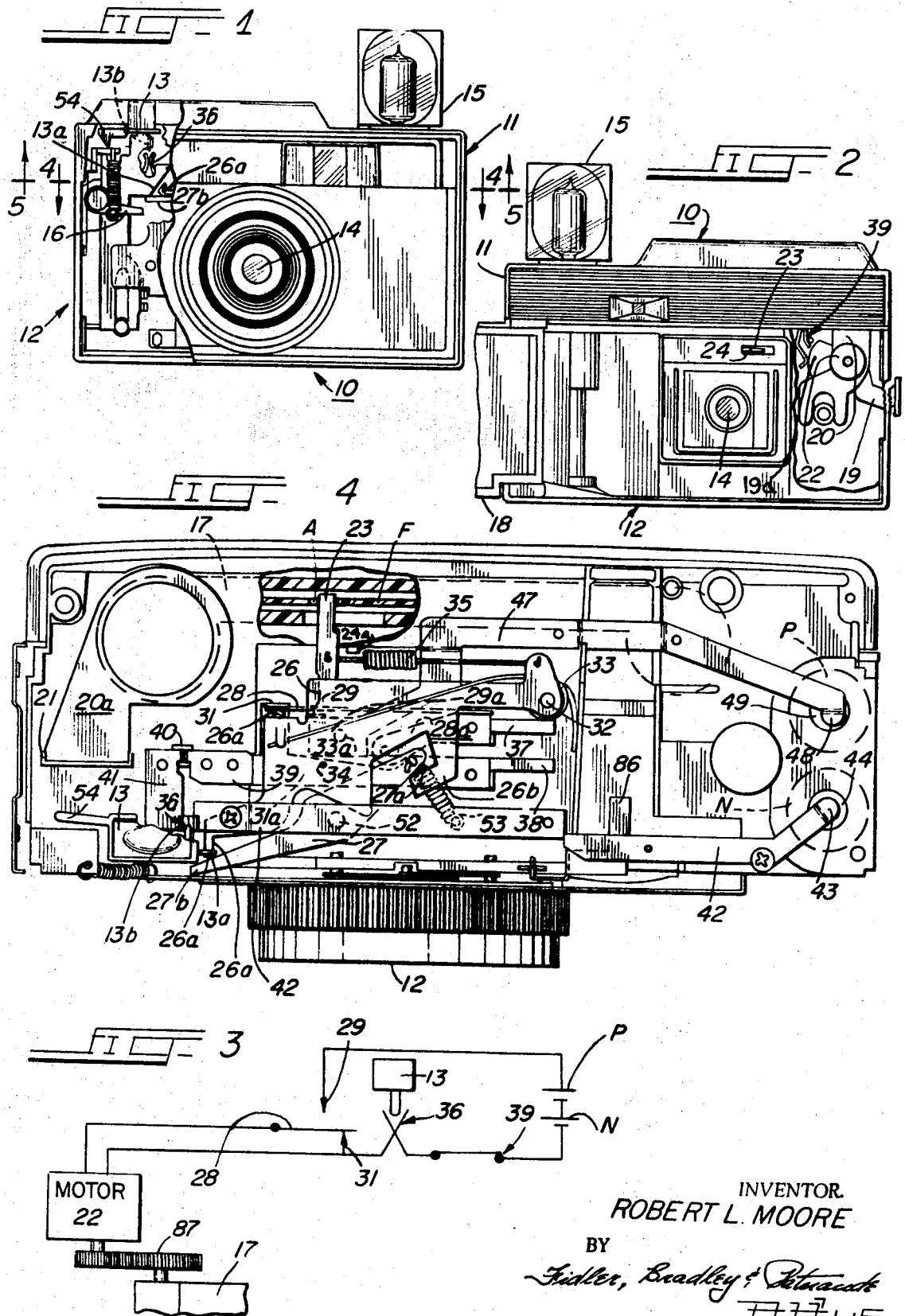
INVENTOR.
ROBERT L. MOORE
BY
Fidler, Bradley & Patnaude
TITUS

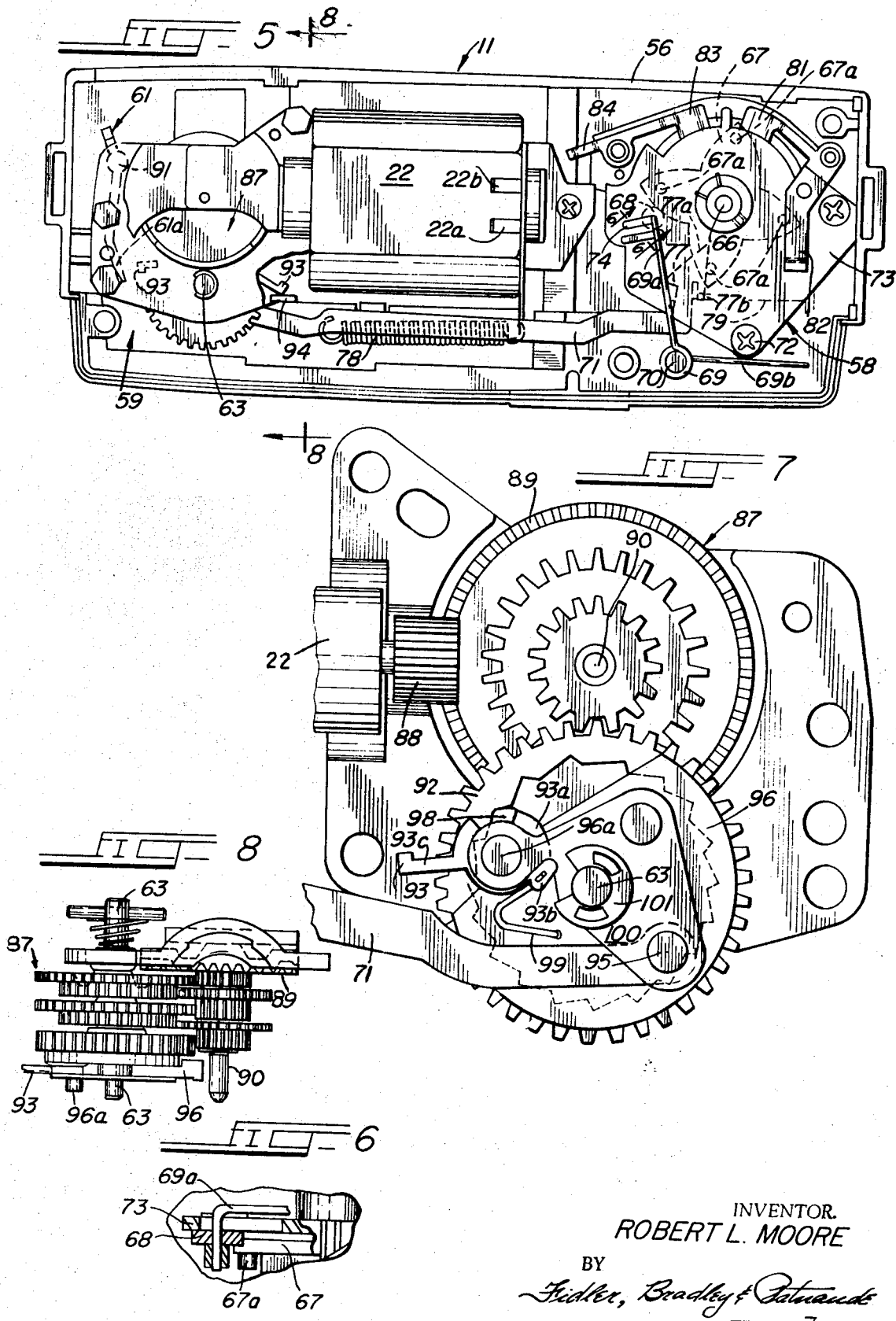

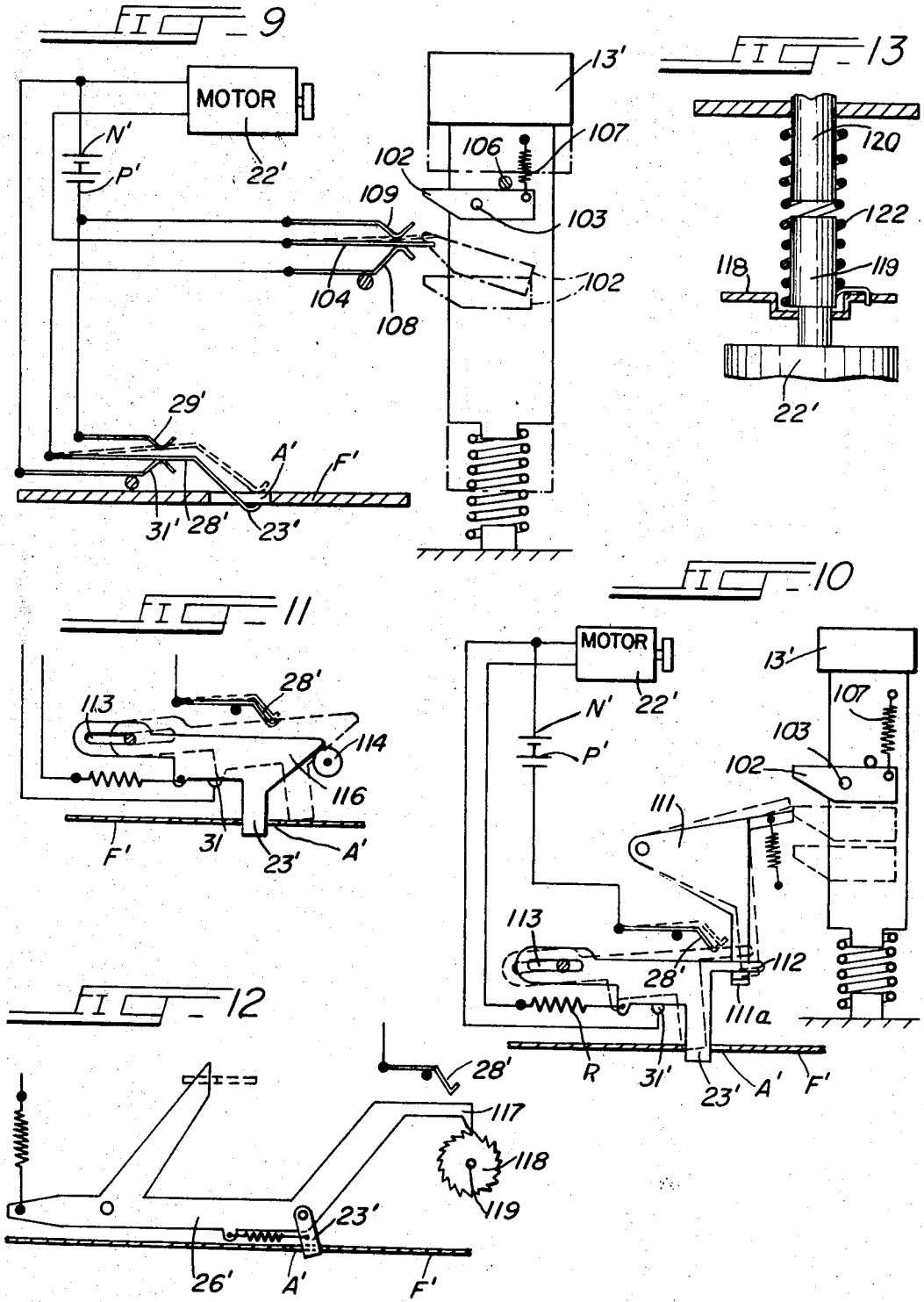

3,543,659

MOTORIZED STILL CAMERA

BACKGROUND OF THE INVENTION

This invention relates to a motorized still camera, and it more particularly relates to a still camera having a motor which advances the film and also causes a flash cube to rotate.

Still cameras have been provided with automatic film advance mechanisms for advancing roll film from one film frame to the next across the exposure area of the camera. The control mechanism was provided with a sensing member for sensing perforations in the film, each perforation corresponding to a different film frame. The sensing member was biased toward and contacted the surface of the moving film as the motor advanced the film from one film frame to the next. When the next succeeding film frame position moved opposite to the exposure area, the sensing member was urged into the corresponding perforation whereby the control mechanism for the motor caused the film to stop abruptly. After an exposure was made, the control mechanism caused the motor to advance the film toward the next succeeding film frame, whereby the sensing member was cammed out of the film perforation and up onto the surface of the moving film so that the cycle of operation could then be repeated.

This type of sensing mechanism has not been entirely satisfactory, because camming of the sensing member out of the perforation causes undue longitudinal strain on the film. Furthermore, a mechanical spring motor having a mechanical brake for stopping the film at the proper film frame position has been employed by the above-described type of camera motor, and consequently a bulky and expensive control mechanism has been required for such a motor.

SUMMARY OF THE INVENTION

Therefore, the principal object of the present invention is to provide a new and improved motorized camera.

Another object of the present invention is to provide a motorized camera having a motor control mechanism with a sensing member for alining the film in the correct exposure area, which sensing member does not cause an undue longitudinal strain on the film.

Still another object of the present invention is to provide an inexpensive and compact camera having an electric motor for advancing the film and also for causing a rotating mechanism to rotate a flash cube.

Briefly, the above and further objects are realized in accordance with the present invention by providing a camera having a subassembly which includes a flash cube rotating mechanism and an electric motor for advancing the film from one film frame to the next and for driving the flash cube rotating mechanism. By utilizing an electric motor instead of a mechanical spring motor, the control mechanism for the motor is vastly simplified and is physically smaller in size, so that the camera of the present invention is extremely efficient and economical. In order to prevent undue longitudinal strain on the film when the motor starts to advance the film, the sensing member of the control mechanism is provided with a retractor which withdraws the sensing member from the perforation after an exposure is made and before the film starts to move, instead of camming the sensing member out of the perforation. Also, for the purpose of preventing undue longitudinal strain on the film, the sensing member is movable in the longitudinal direction so that when the sensing member enters a perforation, the sensing member can move longitudinally with the film as the film coasts to a stop.

BRIEF DESCRIPTION OF THE DRAWINGS

These and further objects of the present invention will be understood more fully and completely from the following detailed description when considered with reference to the accompanying drawings, wherein:

FIG. 1 is a front elevational view of a camera which may employ the principles of the present invention having parts broken away to disclose the construction thereof;

FIG. 2 is a back elevational view of FIG. 1 with parts broken away to show the construction thereof, and with the rear door shown partially broken away and located in an open position;

FIG. 3 is a schematic circuit diagram which illustrates the circuitry for supplying power to the electric motor;

FIG. 4 is an enlarged cross-sectional view of FIG. 1 taken substantially along the line 4—4 thereof;

FIG. 5 is an enlarged cross-sectional view of FIG. 1 taken substantially along the line 5—5 thereof;

FIG. 6 is an enlarged cross-sectional view of FIG. 5 taken substantially along the line 6—6 thereof;

FIG. 7 is an enlarged plan view of a portion of the flash cube rotating mechanism of FIG. 5;

FIG. 8 is an enlarged cross-sectional view of FIG. 5 taken substantially along the line 8—8 thereof; and FIGS. 9—13 are schematic representations of various different modifications for the control mechanism for the motor.

DESCRIPTION OF THE PREFERRED EMBODIMENTS

Referring now to FIG. 1, there is shown a camera 10 which may incorporate the principles of the present invention. The principal elements of the camera 10 comprise an upper subassembly 11 and a lower subassembly 12. The lower subassembly 12 includes a shutter release 13 and a lens 14 for enabling light to be focused upon roll film to selectively expose the film as it sequentially advances across an exposure area located in the focal plane of the lens 14. The upper subassembly 11 includes a flashcube 15 at the top portion thereof. In operation, upon making an exposure by depressing the normally raised shutter release 13, the flash cube 15 flashes, and then rotates 90° in response to a flash cube rotating mechanism mounted within the upper subassembly 11. In order to cause the rotating mechanism to operate, an electric motor mounted within the upper subassembly 11 is controlled by a control mechanism located in the lower subassembly 12, and is energized from a pair of dry cell batteries which are also used for energizing the flash cube 15. While the motor causes the rotating mechanism to function, the motor also advances the film located in the lower subassembly 12 to the next succeeding film frame position so that the cycle of operation may then be repeated.

In order to expose one film frame, the slidably mounted shutter release 13, which forms a part of the lower subassembly 12, is depressed from its spring-biased, normally raised position in a downward direction to its extreme lower position. As a result, a pivotally mounted spring-biased finger 16 is caused to actuate a conventional shutter mechanism, not shown in the drawings.

As shown in FIG. 4, the rear portion of the lower subassembly 12 of the camera 10 is provided with a compartment for receiving a film cartridge 17 having a film F mounted therein, shown partially in cross section and partially in dotted lines in FIG. 4. A door 18 is provided with a latch 19, which is slidably mounted on an inner wall of the lower subassembly 12, and which may be pulled away from the camera housing with a sideward motion into an unlatched position, as illustrated, to release the door 18 so that it may be opened to obtain access to the rear compartment. In order to lock the door 18, the latch 19 is provided with a finger, not shown, which engages a slot, not shown, in the free end of the door 18 to latch it in a closed position.

For the purpose of causing the motor located in the upper subassembly 11 to be mechanically coupled to the left-hand, takeup roll of the film cartridge 17, a vertically extending slide 20 (FIG. 2) extends upwardly through an opening 21 (FIG. 4) in an upper wall of the lower subassembly 12, and it has an upper ringlike top portion 20a bent at right angles to the lower vertically extending portion thereof for supporting a film-cartridge engaging socket, not shown, which is coupled to the output of the motor located in the upper subassembly 11 and is positioned over an opening in the upper wall of the lower subassembly above the takeup roll of the film cartridge 17. The slide 20 is slidably mounted in an overlying relationship with the latch 19 by means of a generally circular leaf spring 22, which holds the slide 20 in frictional engagement with the latch 19 so that upon pushing the latch 19 into a latching position contiguous with the camera housing, the slide 20 moves downwardly to cause the film cartridge engaging socket to engage the takeup roll of the film cartridge 17.

As shown in FIG. 5, an electric motor 22 is mounted within the upper subassembly 11 for advancing the film F in the film cartridge 17, and also for causing the flash cube 15 to rotate. As shown in FIG. 4, in order to supply electrical energy to the motor 22 and to the flash cube 15, a pair of conventional dry cell batteries P and N fit in a compartment in the right side of the lower subassembly 12.

Considering now a control mechanism for the motor 22 and with reference to FIGS. 3 and 4, the motor 22 is controlled by a mechanism mounted, as illustrated in FIG. 4, in a recess at the top portion of the lower subassembly 12. The principal elements of the control mechanism include a sensing finger or member 23 extending through a slot 24 (FIG. 2) in the frontmost wall of the rear cartridge compartment to engage the film perforations A in the film F, a retractor 26 pivotally connected to the sensing finger 23 for withdrawing it out of engagement with the film perforation A, a double exposure prevention arm 27, and a switch blade 28 which is normally biased into contact with a motor ON contact 29 and movable in response to the retractor 26 into contact with a dynamic braking contact 31. In operation, when the film cartridge 17 is first inserted into the rear compartment, the film leader pushes the finger 23 forwardly. As a result, the finger 23 pushes the retractor 26 in a forward direction so that the switch blade 28 is permitted to spring in a forward direction until it contacts the motor ON contact 29 thereby to complete a circuit from the batteries P and N to the motor 22, as shown schematically in FIG. 3. Thereafter, the motor 22 advances the film F in the cartridge 17 until the spring-biased retractor 26 resiliently urges the sensing finger 23 into engagement with the first film perforation A, as shown in FIG. 4, whereby the retractor 26 urges the switch blade 28 into contact with the dynamic braking contact 31. As a result, the armature winding of the motor 22 is short-circuited, whereby the motor 22 causes the film to stop abruptly at the first film frame position corresponding to the first film perforation A. As the retractor 26 moves rearwardly when the sensing finger engages a film perforation, the retractor 26 causes the double exposure prevention arm 27 to pivot out of the path of travel of the shutter release 13 so that the shutter release may then be depressed to expose the first film frame. Depressing the shutter release 13 causes the retractor 26 to move forwardly thereby to withdraw the sensing finger 23 from the perforation A. While moving in a forward direction, the retractor 26 urges the switch blade 28 into contact with the motor ON contact 29 so that after the first film frame is exposed, the motor 22 advances the film toward the next succeeding film perforation to repeat the cycle of operation.

In order to move the sensing finger 23 between a perforation engaging position and another position out of engagement with the film perforation, the retractor 26 is pivotally mounted at pivot point 32, and a coil spring 33 having a free end 33a connected to the retractor is wrapped about the pivot point 32 to bias the retractor 26 toward the film F. The sensing finger 23 is pivotally connected to the retractor 26 at a pivot point 34, and, therefore, the finger 23 is also spring biased toward the film F. Due to the pivotal connection between the sensing finger 23 and the retractor 26, the lateral tension on the film F is minimized, because the finger 23 moves in a lateral direction as the film coasts to a stop until the finger 23 abuts the frontmost wall of the rear cartridge compartment at the right side of the slot 24 (FIG. 2). A coil spring 35 is connected to the sensing finger 23 to cause it to snap sidewardly back to its normal position out of alinement with the perforation A after the sensing finger 23 is retracted from a film perforation against a stop 24a.

As shown in FIG. 4, the retractor 26 is provided with an insulator block 26a which contacts the switch blade 28 to insulate it from the retractor 26. As shown in FIG. 1, for the purpose of enabling the retractor 26 to move forwardly in response to the downward movement of the shutter release 13, the shutter release 13 includes a cam surface 13a which is normally located opposite and slightly spaced from a cam surface 26a of the retractor 26. As the shutter release cam surface 13a moves downwardly into engagement with the retractor cam surfaces 26a, the cam surface 26a is moved forwardly thereby to pivot the retractor 26, whereby the retractor 26 permits the switch blade 28 to spring forwardly into engagement with the motor ON contact 29. For the purpose of preventing the motor 22 from advancing the film F until after the shutter release 13 is permitted to return to its normally raised position, a pair of upstanding, normally closed contacts 36 electrically couple, as shown in FIG. 3, the battery N to the motor 22. The contacts 36 are located adjacent the rear side of the shutter release 13 underneath a finger 13b which is connected to the rear side of the shutter release 13 so that when the shutter release 13 is depressed, the finger 13b moves between and thereby forces the contacts 36 apart to temporarily disconnect the battery N from the motor 22. The contacts 36 are forced apart before the shutter release cam surface 13a contacts the retractor cam surface 26a so that the battery N is temporarily disconnected before the retractor moves forwardly to permit the switch blade 28 to move into engagement with the motor ON contact 29. When the shutter release 13 is permitted to return to its normally raised position after exposing the film, the shutter release finger 13b moves upwardly from between the contacts 36, thereby completing a circuit to the motor 22 to advance the film F to the next succeeding film frame position. Since the retractor is urged backwardly by the spring 33 as the shutter release 13 returns to its normal position, in order to prevent the retractor 26 from moving the sensing finger 23 back into the same film perforation and thereby causing the switch blade 28 to move into engagement with the dynamic motor contact 31, the spring 35 causes the sensing finger 23 to snap sidewardly out of alinement with the film perforation A upon withdrawal therefrom so that when the retractor 26 moves the finger 23 rearwardly upon release of the shutter release 13, the finger 23 moves rearwardly until it contacts the surface of the film F adjacent the perforation A. As a result, the finger 23 is prevented from moving rearwardly a sufficient distance to cause the retractor to move the switch blade 28 into engagement with the dynamic switching contact 31.

As shown in Fig. 4, the switch blade 28 may be a metallic strip which is integrally connected and cantilevered from a base plate 28a so that the distal end thereof can contact the dynamic braking contact 31 and the intermediate portion thereof can contact the motor ON contact 29. For the purpose of electrically connecting a terminal 22a of the electric motor 22 (FIG. 5) to the switch blade 28, a finger 37 is integrally connected to the base plate 28a, and is bent upwardly toward the upper subassembly 11 for engaging a motor terminal 22a. The dynamic braking contact 31 may be an upstanding finger portion which is integrally connected to a generally T-shaped base plate 31a. In order to connect another terminal 22b (FIG. 5) of the motor 22 to the dynamic braking contact 31, a spring finger 38 is integrally connected to the base plate 31a. The spring finger 38 is located adjacent to the spring finger 37, and also is bent slightly in an upward direction to electrically contact a terminal 22b of the electric motor 22 in the upper subassembly 11.

In order to prevent the motor 22 from advancing the film F before closing the rear door 18, a pair of spring contacts 39, best illustrated in FIG. 2, is directly connected to the battery N for disconnecting it from the motor 22 while the door 18 is disposed in its open position. As shown in FIG. 2, the spring contacts 39 extend downwardly through an opening 40 in the upper wall of the lower subassembly 12 to a position opposite a curved cam surface 19a of the latch 19 so that upon pulling the latch 19 into an open position, the cam surface 19a forces the spring contacts 39 apart to temporarily disconnect the battery N from the motor 22.

For the purpose of connecting the dynamic braking contact 31 to the rear door safety switch contacts, the base plate 31a extends to the door safety switch contacts and is integrally connected to the right-hand contact thereof (FIG. 4). The left-hand contact is connected to the left-hand contact (FIG. 4) of the shutter release switch 36 by a metallic strip 41. The right-hand contact of the shutter release switch 36 is connected to the battery N by a metallic strip 42 having an end portion 43 which is bent downwardly into a circular opening 44 in the upper wall of the lower subassembly 12 to engage the terminal of the dry cell battery N mounted in the compartment in the right side of the camera 10.

As shown in FIG. 4, the motor ON contact 29 may be an upstanding finger which is integrally connected to a base plate 29a. In order to connect the motor ON contact 29 to the battery P, the base plate 29a is integrally connected by a metallic strip 47 having an end portion 48 which extends through an opening 49, adjacent the opening 44, to electrically engage the dry cell battery P.

As shown in FIG. 4, the double exposure prevention arm 27 may be provided to prevent double exposures. In order to pivot the arm 27 out of the path of travel of the shutter release 13, the arm 27 is pivotally mounted at a pivot point 52, and the arm 27 includes an upstanding lug 27a which bears against an ear 26b of the retractor 26 so that the retractor 26 can cause an opposite end 27b of the arm 27 to pivot forwardly from underneath the cam surface 13a of the shutter release 13. When the retractor 26 moves forwardly to withdraw the sensing finger 23 from a film perforation, the double exposure prevention lever 27 is urged backwardly to its normal position under the shutter release cam surface 13a by means of a coil spring 53, thereby to prevent the shutter release from being depressed before the film F is advanced to the next film frame position.

In order to initiate the operation of the means for rotating the flash cube, the shutter release 13 has a sidewardly extending cam surface 54, as best illustrated in FIG. 1, which is integrally connected thereto for engaging the flash cube rotating means in the upper subassembly 11.

Considering now the upper subassembly 11 in greater detail and with reference to FIG. 5, the upper subassembly 11 includes as its principal elements a housing 56, the electric motor 22, and a flash cube rotating means comprising a socket rotating mechanism 58 and a drive mechanism 59 for driving the socket rotating mechanism 58. In operation, the cam 54 of the shutter release 13 trips a latch trip arm 61 of the drive mechanism 59 to prepare it for driving the socket rotating mechanism 58. After actuating the trip arm 61, the motor 22 is energized by the control mechanism in the lower subassembly 12 to cause the drive mechanism 59 to advance the socket rotating mechanism, whereby the flash cube 15 rotates through 90° to a new position.

The electric motor 22 is mounted within the central portion of the housing 56 of the upper subassembly 11. The motor 22 may be a permanent magnet, direct current motor which is energized from the pair of conventional dry cell batteries P and N. The film F is advanced by means of an output shaft 63 coupled to the motor 22 which shaft is keyed to a conventional socket (not shown in the drawings) for engaging the takeup roll of the film cartridge 17. The armature winding of the motor 22 is connected to the terminals 22a and 22b.

Considering the socket rotating mechanism 58 in greater detail, the principal elements of the rotating mechanism 58 include a shaft 66 rotatably mounted on the housing 56 for supporting a conventional flash cube socket (not shown in the drawings), a cam wheel 67 keyed to the shaft 66 and having four equally spaced cam surfaces or points, a cam follower detent roller 68 which is held firmly against the cam surfaces of the wheel 67 by a coil spring 69 that surrounds a post 70. In operation, for the purpose of rotating the flash cube 15 through 90° to enable a fresh flashbulb to face toward the front of the camera 10, a spring-biased pawl 71 is retracted by the drive mechanism 59 toward the left (FIG. 5) away from the rotating mechanism 58, and thence the mechanism permits the pawl 71 to snap toward the wheel 67 to rotate it and the shaft 66 in a counterclockwise direction, as viewed in FIG. 5. As the wheel 67 rotates, the detent roller 68 follows the cam surface points of the wheel 67 until the spring-biased roller 68 reaches an intersection between two adjacent points of the wheel 67, whereby the roller 68 abruptly stops the rotation of the wheel 67.

In order to mount the detent roller 68 in engagement with the cam wheel 67, and end portion 69a of the coil spring 69 extends from the post 70 to the wheel 67. An opposite end 69b bears against a post 72 which is riveted to a housing bracket 73. The end portion 69a of the spring 69 extends along the under side of the bracket 73, and the distal end of the end 69a is bent upwardly to extend through an elongated opening 74 in the bracket 73 to engage the roller 68 which is disposed above the bracket 73.

For the purpose of enabling the pawl 71 to rotate the cam wheel 67, each of the four points of the cam wheel 67 includes a downwardly extending post 67a for engaging the pawl 71. In order to move the pawl 71 opposite one of the posts 67a, the pawl 71 includes a generally triangularly shaped head portion 77 which has a slant surface 77a so that as the pawl 71 is retracted past the post 67a to be pushed, the slant surface 77a bears against the adjacent post 67a and slides therealong until the head 77 moves past it.

A coil spring 78 is connected to the pawl 71 to cause it to be biased toward the posts 67a. In order that the extended spring 78 exerts a sufficient lateral force on the pawl to cause the head 77 to move opposite the nearest post 67a when the head 77 is retracted past the adjacent post, the spring 78 is connected to the pawl 71 at a slight angle with respect to the longitudinal path of movement of the pawl 71 to exert a slight transverse force on the pawl 71. As a result, after moving past the adjacent post 67a, the head 77 moves a slight amount transversely to the longitudinal path of movement of the pawl 71 until a lug or hook portion 77b of the head 77 contacts an abutment 79 in the housing 56, whereby the head 77 moves to a position opposite the post 67a. Thereafter, the pawl 71 may be released by the drive mechanism 59 to permit the bias spring 78 to cause the pawl to snap forwardly to push the pin 67a so that the cam wheel 67 is caused to rotate in a counterclockwise direction as viewed in FIG. 5.

In order to supply current flow to the flash cube 15 from the dry cell batteries P and N, the flash cube 15 electrically contacts a spring terminal 81 which is integrally connected to a downwardly bent metallic strip 82 that engages the metallic strip 47, shown in FIG. 4, near its end portion 48. The flash cube 15 also electrically contacts another terminal 83, which is integrally connected via a downwardly bent metallic strip 84 for engaging a metal conductor 86 in the lower subassembly 12, as shown in FIG. 4. The conductor 86 is connected via a conventional switch, not shown, which responds to the actuation of the shutter to couple the terminal 83 to the conductor 86 to supply current flow to the flash cube 15.

Referring now to FIGS. 5—8, the drive mechanism 59 will now be considered in greater detail. The principal elements of the drive mechanism 59 includes a gear train 87 driven by a pinion gear 88 from the motor 22 and having a crown gear 89 mounted on a shaft 90 disposed in a parallel, spaced-apart relationship to the output shaft 63, the trip lever arm 61 pivotally mounted at a pivot point 91, a ratchet gear 92 mounted on the output shaft 63, and a lever arm 93 for responding to the trip lever arm 61 to control the operation of the pawl 71. In operation, upon actuating the shutter release 13, the cam 54 of the shutter release 13 (FIG. 1) engages the trip lever 61 thereby to cause it to pivot about the pivot point 91, until its end 61a engages the lever 93, which is initially located in the position as shown in dotted lines in FIG. 5. As a result, the lever 93 pivots to cause the pawl 71 to be connected to the ratchet gear 92. After the control mechanism in the lower subassembly 12 causes the motor 22 to be energized, the gear train 87 causes the ratchet gear 92 to rotate so that the lever 93 rotates in unison with the ratchet gear 92 in a clockwise direction, as viewed in FIG. 5, through approximately 180° until the lever 93 engages a post 94 mounted on the housing 56. Contacting the post 94 causes the lever 93 to pivot, whereby the lever 93 releases the pawl 71 from the ratchet gear 92 to permit the spring-biased pawl 71 to snap back to its initial position for rotating the flash cube 15.

The gear train 87 is driven by the pinion gear 88, and provides a sufficient speed reduction for the motor 22 to advance the film F in the film cartridge 17 via the shaft 63, and also to cause the pawl 71 to advance the flash cube 15.

As shown in FIG. 7, the trip lever arm 93 is pivotally mounted on a partially circular plate 96 at a pivot point 96a. The plate 96 is rotatably mounted on the shaft 63 and overlies the ratchet gear 92 of the gear train 87. In the idle condition, the plate 96 does not rotate with the gear 92. In order to cause the plate 96 to rotate in unison with the gear 92, a dog 98 is rotatably mounted at the pivot point 96a so that the dog 98 may be moved into engagement with the gear 92 by means of a finger portion 93a of the lever 93. For the purpose of assisting the finger portion 93a of the lever 93 in moving the dog 98 into engagement with the gear 97, a spring 99 is connected to the finger portion 93a in a hole 93b located therein. The trip lever 93 is shown in the engaged position in FIG. 7.

When the gear 92 rotates approximately 180° to the position as shown in FIG. 7, the trip lever 93 contacts the post 94, and as the gear 92 tends to rotate further in a counterclockwise direction, the trip lever 93 is pushed back to its normal position so that an opposite finger portion 93b, with the assistance of the spring 99, pushes the dog 98 out of engagement with the gear 92. Therefore, upon snapping the dog 98 out of engagement with the gear 92, the plate 96 is free to slip with respect to the gear 92 to permit the spring-biased pawl 71 and the plate 96 to rotate freely back to its initial position in a clockwise direction. As a result, the pawl 71 is permitted to snap forwardly and thereby advance the cam wheel 67.

A stiffening plate 100 is secured in overlying relationship to the plate 96 and secured to the pivot points 96a and 95, and also the shaft 63. The gears, levers, and plate for controlling the pawl 71 are keyed to the same shaft 63 by means of an E-ring retainer 101.

OPERATION

In order to load the camera 10 with the film cartridge 17, the latch 19 may be pulled with a sideward motion to an open position, whereby the door safety switch contacts 39 are separated to maintain an open circuit to the motor 22 and the rear door 18 may then be opened to allow insertion of the film cartridge 17 into the rear compartment of the camera 10. After insertion of the cartridge 17, the door 18 may then be closed and the latch 19 pushed into the closed position to move the slide 20 and also the ringlike portion 20a having the cartridge-engaging socket connected thereto (not shown in the drawings) into engagement with the takeup roll of the film cartridge 17. Also, the door safety spring contacts 39 are closed for closing a circuit to the electric motor 22. Once the film cartridge 17 is inserted into the rear compartment, the sensing finger 23 is moved forwardly to move the retractor 26 in a forward direction, whereby the insulator block 26a moves away from the switch blade 28 to enable it to spring away from the dynamic braking contact 31 and into contact with the motor ON contact 29 to tentatively prepare a circuit to the electric motor 22. Also, the retractor ear 26b moves away from the upstanding lug 27a of the double exposure prevention lever 27 to enable the tension spring 53 to pivot the lever 27 about the pivot point 52 so that the end portion 27b of the lever 27 moves within the path of movement of the shutter release 13 below the cam surface 13a thereof, whereby the shutter release 13 is prevented from being actuated until the film F is transported to the first film frame area.

As a further result of moving the latch 19 into the closed position, the door safety spring contacts 39 are permitted to close so that the circuit is completed to the motor 22. As shown in FIG. 3, the circuit to the motor 22 includes the battery P, the motor ON contact 29, the switch blade 28, the motor 22, the normally closed shutter release contacts 36, the closed door safety contacts 39, and the battery N. Consequently, the electric motor 22 rotates its pinion gear 88 to drive the gear train 87 and hence the shaft 63 to advance the film F within the film cartridge 17 to the first film frame position.

When the first perforation corresponding to the first film frame position is reached, the sensing finger 23 is urged rearwardly into the perforation A as a result of the spring 33 which resiliently urges the retractor 26 in a rearward direction. Upon moving of the sensing finger 23 and the retractor 26 in the rearward direction, the insulator block 26a of the retractor 26 moves the switch blade 28 into contact with the dynamic braking contact 31 and out of contact with the upstanding motor ON contact 29 so that the current from the dry cell batteries P and N is removed from the armature windings of the electric motor 22 and the armature windings are short-circuited. Due to the short circuit of the armature winding, the electric motor 22 is rapidly brought to a stop thereby to cause the film F to stop abruptly. As the film F coasts to an abrupt stop, the film F causes the sensing finger 23 to pivot laterally about the pivot point 34 against the force of the spring 35. Also, when the retractor 26 moves rearwardly, the ear 26b of the retractor 26 moves against the lug 27a of the double exposure prevention lever 27 to pivot it about the pivot point 52 to move the end portion 27b forwardly out of the path of movement of the shutter release cam surface 13a so that the shutter release 13 may be depressed for actuating the shutter mechanism.

In order to make the first exposure, the shutter release 13 is depressed from its normally raised position to cause the finger 13b to separate the spring contacts 36 to open the circuit to the motor 22. Upon moving the shutter release 13 to its extreme lower position, the shutter exposes the first film frame, and also the ear 26a of the retractor 26 is moved by the cam surface 13a of the shutter release 13 in a forward direction, whereby the retractor 26 moves forwardly. As a result, the retractor 26 withdraws the sensing finger 23 out of engagement with the first film perforation A. After the finger 23 moves forwardly out of engagement with the perforation A, the spring 35 causes the finger 23 to snap sidewardly out of alinement with the film perforation A. The retractor 26 moves the switch blade 28 out of engagement with the dynamic braking contact 31 and contacts the motor ON contact 29 to prepare a circuit to the motor 22.

Upon releasing the shutter release 13, the shutter release contacts 36 are permitted to close and the sensing finger 23 moves rearwardly into contact with the surface of the film F adjacent the perforation A. Simultaneous with the closing of the contacts 36, the double exposure prevention lever 27 pivots so that the end 27b is moved into the path of the movement of the shutter release 13 under its cam surface 13a for the purpose of preventing movement of the shutter release 13 while the film is being advanced to the next film frame position.

As the shutter release 13 reaches its extreme downward position, the first film frame is exposed by the shutter and the flash cube 15 flashes. Also, the cam surface 54 causes the trip lever 61 to pivot, whereby an end 61a engages the lever 93. Whereupon, the lever 93 pivots about the pivot point 96a to cause the finger portion 93a to push the dog 98 into engagement with the gear 97 whereby the pawl 71 is detachably connected to the gear 97.

Thereafter, the switch blade 28 closes a circuit to the drive motor 22 for advancing the film F to the next succeeding film frame position. The electric motor 22 drives the gear train 87 to advance the film F and also to cause the plate 96 to move in a counterclockwise direction as viewed in FIG. 7, thereby causing the pawl 71 to retract. As the pawl 71 retracts, the head 77 of the pawl 71 moves around the adjacent post 67a of the cam wheel 67. After moving a sufficient distance to the left to clear the post 67a, the pawl 71 snaps forwardly until the hook portion 77b engages the abutment 79, whereby the head 77 is positioned opposite the post 67a.

The plate 96 moves through approximately 180° in a counterclockwise direction to the position shown in FIG. 7 until the trip lever 93 engages the post 94, thereby causing the finger portion 93c of the lever 93 to move the dog 98 out of engagement with the gear 97. Whereupon, the plate 96 rotates freely with respect to the gear 97 as the tension spring 78 causes the pawl 71 to snap toward the right, whereby the cam wheel 67 causes the flash cube 15 to rotate into the next position as governed by the detent roller 68.

After the last exposure is made, the film F is advanced until the film sensing finger 23 slips past the end of the film F thereby to stop the drive motor 22. Thereafter, the film cartridge 17 may be removed from the rear compartment of the camera 10.

ALTERNATIVE CONSTRUCTIONS

Referring now to FIGS. 9—13, there are shown several alternative constructions for the motor control mechanism and other camera mechanisms. In each of the following descriptions, any component parts of the alternative constructions that are similar to or the same as the corresponding parts of the camera 10 already described, are designated with the same reference characters used to designate the corresponding parts of the camera 10 with the addition of a prime.

Referring now to FIG. 9, there is shown a control mechanism for the motor 22 which eliminates the need for a retractor 26. A switch blade 28' is controlled directly by means of a finger 23' which engages the perforations in the film. Furthermore, when an exposure is made, the shutter release 13' is depressed downwardly and a lever 102 pivotally mounted on the shutter release 13' at a pivot point 103 engages a switch blade 104, thereby causing the lever 102 to pivot in a clockwise direction as viewed in FIG. 9. As a result, the shutter release 13' continues in a downward direction as the lever 102 is able to clear the switch blade 104. When the lever 102 has moved past the switch blade 104, it snaps back to its original position against a post 106 by means of a coil spring 107. Upon releasing the shutter release 13', the shutter release 13' retracts to its normal position, whereby the lever 102 moves into contact with the switch blade 104 to move it out of contact with a switch 108 and into contact with a switch 109, thereby removing the short circuit from the armature winding of the motor 22' and closing a circuit which includes the battery P', the contacts 109 and 104, the armature winding of the motor 22', and the battery N'. Consequently, the motor advances the film until the finger 23' moves out of engagement with the perforation and up onto the surface of the film so that the switch blade 28' moves into contact with the motor ON contact 29'. When the shutter release 13' continues on upwardly until the lever 102 releases the switch blade 104 to cause the switch blade 104 to spring back into contact with the contact 108, whereby the circuit remains closed to the drive motor 22'. This circuit includes the battery P', the upper contact 29', the switch blade 28', the contact 108, the switch blade 104, the armature winding of the drive motor 22' and the battery N'. The motor 22' continues to advance the film until the sensing finger 23' drops into the next perforation to open the circuit to the armature winding of the motor 22' and thereby to cause it to be short-circuited by contacting the lower contact 31'.

Referring now to FIG. 10, for the purpose of eliminating the shutter release switch and also to permit a greater film-over travel, a lever 111 pivots in response to the return movement of the shutter release 13', in the same manner as described in connection with FIG. 9. An ear 111a of the lever 111 contacts a finger 102 connected to the sensing member 23' to move it out of engagement with the perforation in the film. Whereupon the sensing member 23' moves out of engagement with the dynamic braking contact 31' and then moves into contact with the switch blade 28' to energize the motor 22' through a circuit path which includes the batteries N' and P', the switch blade 28', the conductor sensing member 23', a conductor spring R, and the motor 22'. Consequently, the motor 22' is not energized unless and until the shutter release 13' is released to cause the pivotal movement of the lever 111.

For the purpose of enabling over travel of the film as it coasts to a stop, the sensing member 23' is slidably mounted at 113.

Referring now to FIG. 11, in order to reduce the number of parts for the control mechanism, a similar type of film sensing member with the same electrical circuitry as shown in FIG. 10 may be employed. The sensing member 23' is pivotally and slidably mounted at 113 so that a retract roller or cam surface 114 can move against a cam surface 116 of the sensing member 23' to retract it from the film perforation.

As shown in FIGS. 12 and 13, in order to eliminate the dynamic braking contact and to use lower cost motors with wider torque tolerances, a mechanical braking arrangement may be employed. Except for the dynamic brake contact, the conductor sensing member 23' is provided with the same type of electrical circuitry as shown in the embodiment of FIG. 10. The sensing member 23' is pivotally mounted on the retractor 26' so that when the sensing finger 23' engages a film perforation, as illustrated, an end portion 117 of the retractor 26' pivots away from the switch blade 28' for removing the source of current flow from the motor in the same manner as described in connection with FIG. 10. Also, the end portion 117 moves into engagement with a ratchet wheel 118 which is mounted on an output shaft 119 which forms part of a spring clutch (FIG. 13) for a motor 22'. The end portion 117 thereby prevents rotation of the ratchet wheel 118 and also a shaft 120 which is alined with the shaft 119 and which causes the film to be advanced so that the film abruptly stops in response to stopping the rotation of the ratchet wheel 118. In order to abruptly stop the film as the motor 22' coasts to a stop, the spring clutch includes a coil spring 122 which is wrapped about both of the alined shafts 119 and 120 so that both shafts move in unison while the end portion 117 is not in engagement with the ratchet wheel 118. When the end portion 117 engages the ratchet wheel 118, the spring 122 slips with respect to the shaft 119 which coasts to a stop, thereby causing the shaft 120 to stop abruptly.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. In a still camera including a camera housing adapted to receive and support a roll film, a shutter release member movable between a normal position and a film exposing position for actuating a shutter mechanism, a socket rotatably mounted on the camera housing and adapted to receive a multilamp photoflash unit, electrical terminals connected to said socket and adapted to be connected to a source of electrical power thereby to energize a multilamp unit inserted in said socket, a rotating mechanism for rotating said socket and the multilamp unit inserted therein, wherein the improvement comprises:

electric motor means for advancing said film along a plane;
　spring means cooperating with said rotating mechanism;
　said electric motor means responsive to the movement of said shutter release member into its film exposing position for stretching said spring means to store energy therein; and
　release means for releasing the stretched spring means to drive said rotating mechanism thereby to rotate said socket.

2. The combination according to claim 1, further including:

a sensing member movable between a first position contacting the surface of the film for causing said motor means to advance the film and a second position in one of said film perforations for causing said motor means to cease advancing said film so that said film stops moving in the film frame position corresponding to the perforation receiving said sensing member;

retractor means responsive to said shutter release member for withdrawing said sensing member from said second position in the film perforation to a position away from the surface of said film out of said perforation and subsequently for permitting said sensing member to move toward the surface of the film; and switch means responsive to said sensing member moving from said second position in one of said perforations and said shutter release member returning to its normal position for causing said motor means to advance said film.

3. In a still camera including a camera housing adapted to receive and support a roll film, a shutter release member movable between a normal position and a film exposing position for actuating a shutter mechanism, a socket rotatably mounted on the camera housing and adapted to receive a multilamp photoflash unit, electrical terminals connected to said socket and adapted to be connected to a source of electrical power thereby to energize a multilamp unit inserted in said socket, a rotating mechanism for rotating said socket and the multilamp unit inserted therein, wherein the improvement comprises:

electric motor means for advancing said film along a plane;
spring means cooperating with said rotating mechanism;
said electric motor means responsive to the movement of said shutter release member into its film exposing position for stretching said spring means to store energy therein;
release means for releasing the stretched spring means to drive said rotating mechanism thereby to rotate said socket;
gear means driven by said motor means;
connecting means for detachably connecting said spring means to said gear means; and
wherein said shutter release member includes a cam surface for causing said connecting means to detachably connect said spring means to said gear means in response to said shutter release moving into its film exposing position, and said release means subsequently causes said connecting means to disconnect said stretched spring means from said gear means to thereby release said spring means.

4. A still camera including a housing adapted to receive and support a roll film having a series of perforations corresponding to a series of film frame positions, film advancing means to advance the film along a plane, a sensing member movable between a first position contacting the surface of the film for causing said film advancing means to advance the film and a second position in one of said film perforations for causing said film advancing means to cease advancing said film so that said film stops moving in the film frame position corresponding to the perforation receiving said sensing member, and a shutter release movable from a normal position to a film exposing position, wherein the improvement comprises:

retractor means responsive to said shutter release for withdrawing said sensing member from said second position in the film perforation to a position away from the surface of said film out of said perforation and subsequently for permitting said sensing member to move toward the surface of the film, said retractor means withdrawing said sensing member from said second position in said film perforation to a position away from the surface of the film out of said perforation and out of alinement with said perforation before said film driving means advances said film in response to the movement of said shutter release into the film exposing position;

said film advancing means including electrical terminals adapted to be coupled to a source of electrical power, and electric motor having its output coupled to said film for advancing it, a motor ON switch means responsive to said sensing member moving from said second position in one of said perforations for tentatively coupling said source via said electrical terminals to said motor, and shutter release switch means responsive to said shutter release returning to its normal position for coupling said source via said terminals and said motor ON switch means to said motor to advance said film;

a flash cube rotating mechanism adapted to support a flash cube and responsive to the output of said electric motor for rotating said flash cube after said shutter release moves into its film exposing position;

said shutter release including a cam surface for initiating the operation of said rotating mechanism upon said shutter release moving into its film exposing position; and said rotating mechanism including a gear train coupled to said output of said motor for causing said mechanism to rotate said flash cube after said shutter release moves into its film exposing position.

5. A still camera including a housing adapted to receive and support a roll film having a series of perforations corresponding to a series of film frame positions, film advancing means to advance the film along a plane, a sensing member movable between a first position contacting the surface of the film for causing said film advancing means to advance the film and a second position in one of said film perforations for causing said film advancing means to cease advancing said film so that said film stops moving in the film frame position corresponding to the perforation receiving said sensing member, and a shutter release movable from a normal position to a film exposing position, wherein the improvement comprises:

retractor means responsive to said shutter release for withdrawing said sensing member from said second position in the film perforation to a position away from the surface of said film out of said perforation and subsequently for permitting said sensing member to move toward the surface of the film, said retractor means withdrawing said sensing member from said second position in said film perforation to a position away from the surface of the film out of said perforation and out of alinement with said perforation before said film driving means advances said film in response to the movement of said shutter release into the film exposing positions;

said film advancing means including electrical terminals adapted to be coupled to a source of electrical power, an electric motor having its output coupled to said film for advancing it, a motor ON switch means responsive to said sensing member moving from said second position in one of said perforations for tentatively coupling said source via said electrical terminals to said motor, and shutter release switch means responsive to said shutter release returning to its normal position for coupling said source via said terminals and said motor ON switch means to said motor to advance said film;

a door hingedly mounted on the housing for moving into an open position to provide access to a compartment in said housing for receiving said roll film;

safety switch means for inhibiting said motor until said door is moved into a closed position; and a latch connected to said door for latching said door in its closed position, said safety switch means coupling said terminals to said shutter release switch means in response to said latch latching said door in its closed position and before the motor advances the film to its next succeeding film frame position.

6. A still camera including a housing adapted to receive and support a roll film having a series of perforations corresponding to a series of film frame positions, film advancing means to advance the film along a plane, a sensing member movable between a first position contacting the surface of the film for causing said film advancing means to advance the film and a second position in one of said film perforations for causing said film advancing means to cease advancing said film so that said film stops moving in the film frame position corresponding to the perforation receiving said sensing member, and a shutter release movable from a normal position to a film exposing position, wherein the improvement comprises:

retractor means responsive to said shutter release for withdrawing said sensing member from said second position in the film perforation to a position away from the surface of said film out of said perforation and subsequently for permitting said sensing member to move toward the surface of the film;

said film advancing means including electrical terminals adapted to be coupled to a source of electrical power, an electric motor having its output coupled to said film for advancing it, and motor ON switch means responsive to said sensing member moving from said second position in one of said perforations for coupling said source via said electrical terminals to said motor;

a lever pivotally mounted on said shutter release and having a cam surface for moving said retractor means only when said shutter moves from its film exposing position and for yieldingly engaging said retractor means when said shutter release moves toward its film exposing position; and said retractor means being pivotally and slidably mounted on said housing for moving with the film in the direction of travel thereof as said film coasts to a stop so that the last-mentioned lever can pivot said retractor means away from the surface of the film in response to said shutter release moving away from its film exposing position.

7. In a still camera including a camera housing adapted to receive and support a film cartridge containing film, a flash socket rotatably mounted thereon for supporting a multilamp photoflash unit, electrical terminals mounted on the housing and adapted to be connected to a source of electrical power to energize the multilamp unit inserted in the flash socket, a rotating mechanism for rotating the flash socket, wherein the improvement resides in a detachable subassembly mounted on the camera housing, said subassembly comprising:

a subassembly housing detachably mounted on the camera housing;

an electrical motor mounted within the subassembly housing and electrically coupled to said terminals, said motor having an output for advancing said film;

means for mounting the rotating mechanism within said subassembly housing;

means for mechanically coupling said output of said motor to said rotating mechanism for causing it to rotate said flash socket;

said film including a series of spaced-apart irregularities corresponding to a series of film frame positions;

a shutter release movable from a normal position to a film exposing position; and a control mechanism mounted within said camera housing for selectively coupling said source to said motor, said control mechanism including a film sensing member for detecting said irregularities, motor ON switch means responsive to said film sensing member detecting one of said irregularities in said film for causing said motor to cease advancing the film, restart switch means for coupling said source via said terminals to said motor, and a restart trip lever pivotally mounted on said shutter release and having a cam surface for actuating said restart switch means to start said motor to advance said film.